Nov. 15, 1966  H. HELLER ETAL  3,285,054
PROGRAMMER FOR FLUID ANALYSIS
Original Filed May 24, 1961  4 Sheets-Sheet 1

INVENTORS.
HERBERT HELLER
HENRY J. THEN
CLAYTON J. BOSSART
ALEXANDER C. McINNES
BY EARL M. BECKER

ATTORNEY

Nov. 15, 1966    H. HELLER ETAL    3,285,054

PROGRAMMER FOR FLUID ANALYSIS

Original Filed May 24, 1961    4 Sheets-Sheet 2

INVENTORS.
HERBERT HELLER
HENRY J. THEN
CLAYTON J. BOSSART
BY  ALEXANDER C. McINNES
EARL M. BECKER

ATTORNEY.

Nov. 15, 1966
H. HELLER ETAL
3,285,054
PROGRAMMER FOR FLUID ANALYSIS
Original Filed May 24, 1961
4 Sheets-Sheet 3
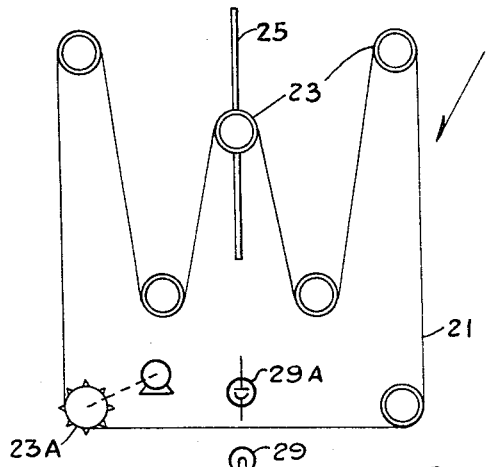
Fig. 3.
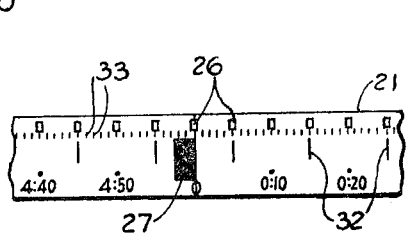
Fig. 4.
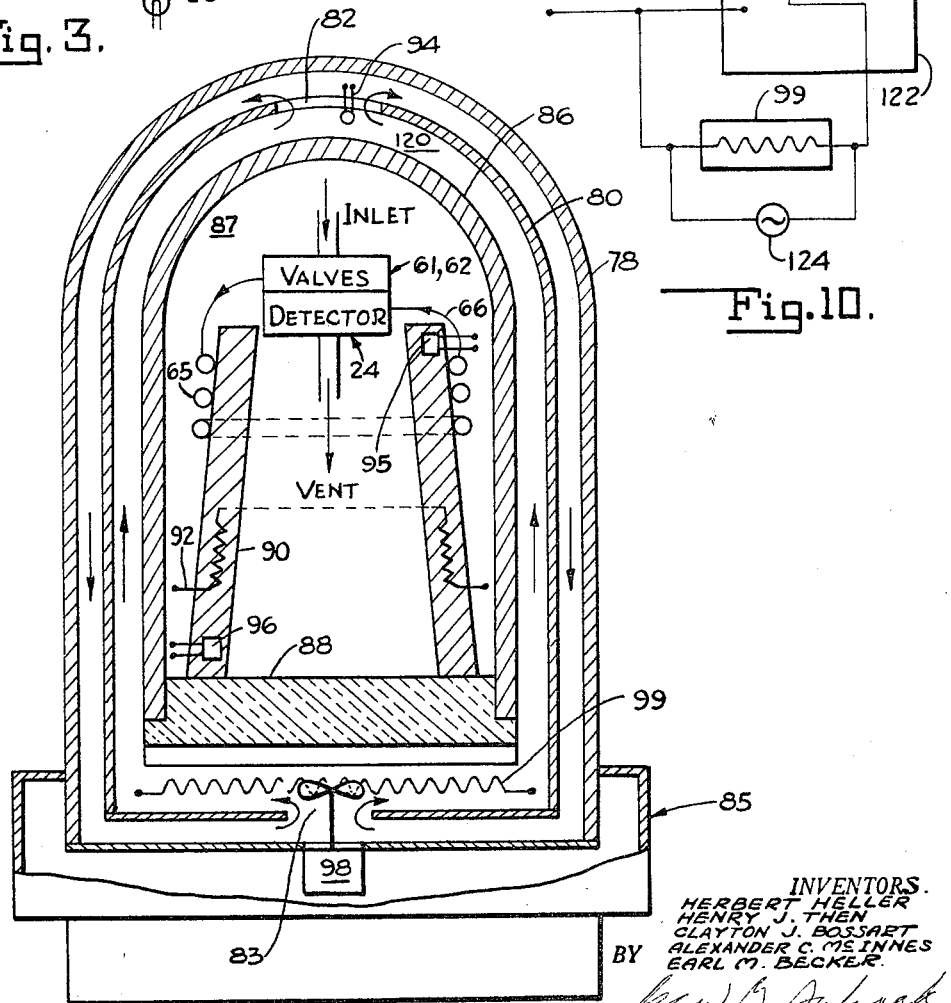
Fig. 10.
Fig. 8.
INVENTORS.
HERBERT HELLER
HENRY J. THEN
CLAYTON J. BOSSART
ALEXANDER C. McINNES
EARL M. BECKER
BY
ATTORNEY Nov. 15, 1966  H. HELLER ETAL  3,285,054
PROGRAMMER FOR FLUID ANALYSIS
Original Filed May 24, 1961  4 Sheets-Sheet 4

INVENTORS
HERBERT HELLER
HENRY J. THEN
CLAYTON J. BOSSART
ALEXANDER C. McINNES
EARL M. BECKER.
BY
ATTORNEY

3,285,054
PROGRAMMER FOR FLUID ANALYSIS

Herbert Heller and Henry J. Then, Pittsburgh, Clayton J. Bossart, Monroeville, Alexander C. McInnes, Export, and Earl M. Becker, Pittsburgh, Pa., assignors to Mine Safety Appliances Company, Pittsburgh, Pa., a corporation of Pennsylvania
Original application May 24, 1961, Ser. No. 112,446, now Patent No. 3,199,338, dated Aug. 10, 1965. Divided and this application Dec. 24, 1964, Ser. No. 420,910
3 Claims. (Cl. 73—23.1)

This application is a division of application Serial No. 112,446 filed May 24, 1961 for Fluid Analysis, and now Patent No. 3,199,338.

This invention pertains to fluid analysis and particularly to the means for analyzing gases using gas chromatography principles.

The invention pertains to fluid chromatography either the adsorption type or the gas-liquid partition type. Merely for the purposes of illustration, this invention will be described in connection with adsorption chromatography wherein a column or columns contain appropriate adsorbents, usually in granular form, to separate various constituents of a gas sample or samples. The sample is introduced to the column in a carrier gas stream continuously flowing through the column. Various components of the gas sample are separated by the process of selective adsorption and desorption so that the separated constituents issue from the end of the column in sequential order corresponding to their volatility, weight or property affecting the degree of adsorption on the packing material in the column. Conventionally, the separated gases emerge from the column and then pass through a suitable detector element which in some known way measures the property of the gas indicative of the character and amount present.

Prior art devices have not been fully satisfactory in that the instrument which programs or times the sequence of events lacks precision and flexibility. These devices, also, require improvement in the valving and valve control used in the chromatographic columns. In addition, experience has shown that previous analyzers were not altogether stable because of uneven temperature conditions. Moreover, such analyzers are restricted in column arrangement and operation.

It is an object of this invention to overcome the aforesaid disadvantages by providing an analyzer which is precise and flexible in its operations, stable insofar as internal and ambient temperatures are concerned, and permits the use of at least two columns to be operated independently or simultaneously in either direction with the option of using the two columns in series or parallel.

The invention will be clearly understood with reference to the following description taken in conjunction with the accompanying drawings, in which:

FIG. 3 shows the programmer schematically;

FIG. 4 is a fragmentary view of the tape used in the programmer;

FIG. 8 is a vertical sectional view of the analyzer housing; and

FIGS. 9 and 10 show the high and low temperature control circuits,

Figure 1:
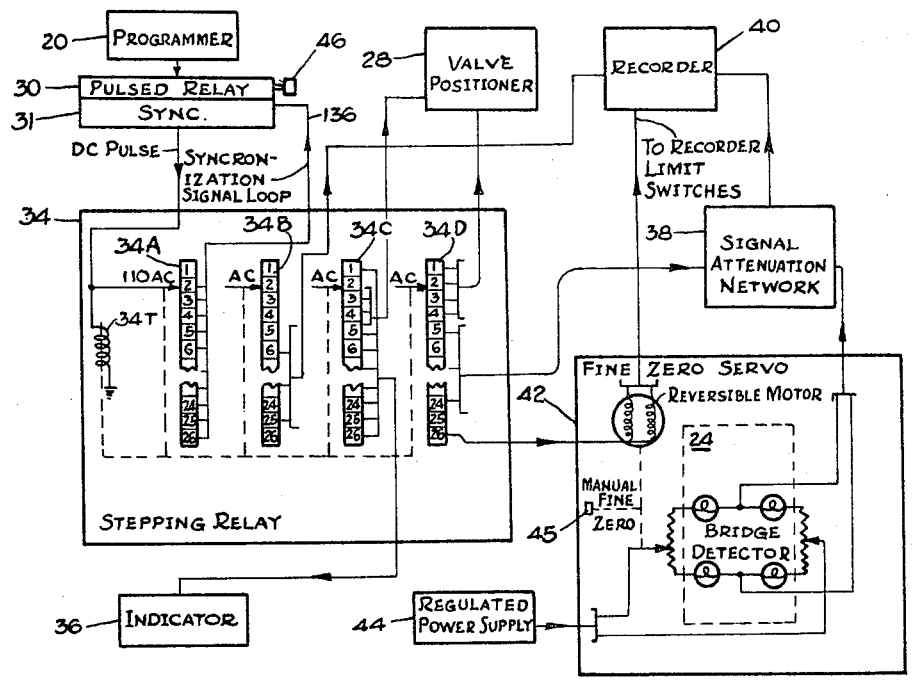
FIG. 1 shows a schematic and diagrammatic wiring circuit of this invention.

Referring briefly to FIG. 1, a programmer 20 sets up a program of gas analysis for the chromatograph having therein a detector 24 and valve positioner 28. The signal or pulse produced by programmer 20 is fed into a pulsed relay 30 and synchronization circuit 31, the output D.C. pulse of which is fed into the D.C. stepping relay 34. This relay is a four level, four interrupter contact type with 26 steps (the contacts and some of the steps are not shown). Relay 34 serves indicator 36 which enunciates the functions of the levels of relay 34, valve positioner 28, synchronization circuit 31, signal attenuation network 38, recorder 40 and fine zero servo 42. Each signal produced by the pulsed relay 30 causes the four levels of relay 34 to advance one step. The synchronization pulse initiated by the programmer 20 as a results of portion 27 (FIG. 4) is sensed by synchronization circuit 31 to cause the relay 34 to return to its number one contacts by way of synchronizing signal fed to level 34A. The long pulse produced by the wide portion 27 is sensed by a time delay relay 31A (FIG. 2) which feeds the synchronizing signal to relay 34 to reset all relay levels. If, however, all levels are at their number one contacts, the synchronizing pulse has no affect on relay 34. Level 34B produces a chart drive signal received by recorder 40. Simultaneously, level 34C produces a signal to indicator 36 and valve positioner 28, and level 34D produces three signals; one to actuate valve positioner 28, one received by signal attentuation network 38 to accomplish the proper attenuation and one which feeds servo 42 for adjusting the fine zero of detector 24. This fine zero can be manually adjusted by knob 45. Regulated power supply 44 supplies power to detector 24. Push button 46 permits the system to be operated manually if the programmer 20 is not used. All of these components coact to manipulate the chromatograph in a predetermined fashion to effect gas analysis.

FIG. 3 shows the programmer or sequence timer 20 comprising a tape or film 21, such as, a 16 millimeter film. This tape is threaded around smooth spools 23 and a sprocket 23A in a continuous loop. One of the spools 23 rides in a slot 25 for adjusting the tightness of the tape around the spools. As is best seen in FIG. 4, tape 21 contains sprocket holes 26 for engagement with sprocket 23A. Numeral 27 represents a wide blanked or darkened portion which interrupts the light radiated by lamp 29 to cause a synchronization D.C. pulse to register in photoelectric receiver 29A to close relay 30B. Numeral 32 referse to marks placed on the tape to produce pulses as just mentioned. These marks are placed at selected intervals by pencil or any other suitable marking means so that a preset programming is available for the chromatograph. Time division marks 33 act as guides for marking the tape.

The basis for sequence timing is the passing of tape 21 between the photoelectric transmitter and receiver at a sequence speed. Each mark on the film will cause the receiver to feed a signal to pulsed relay 30 and synchronization circuit 31 which in turn advances the stepping relay 34. The tape is graduated on a time basis, one second divisions, for example, and the length is cut to correspond to the analysis time or a multiple of the analysis time required. As the stepping relay contacts do not advance until the end of the marking, the thickness of the mark is of no consequence and the timing is determined by the placement of the trailing edge of the mark. Portion 27 provides a long pulse that is sensed by relay 31A of circuit 31 (see FIG. 2) to reset the stepping relay 34. As this relay should be at its first step at this time of the cycle, portion 27 will monitor synchronization. The system will be accurate to the extent of automatically synchronizing within one film loop during start-up or after a momentary power failure. The light beam intensity of lamp 29 is adjusted to provide proper sensitivity.

Figure 2:
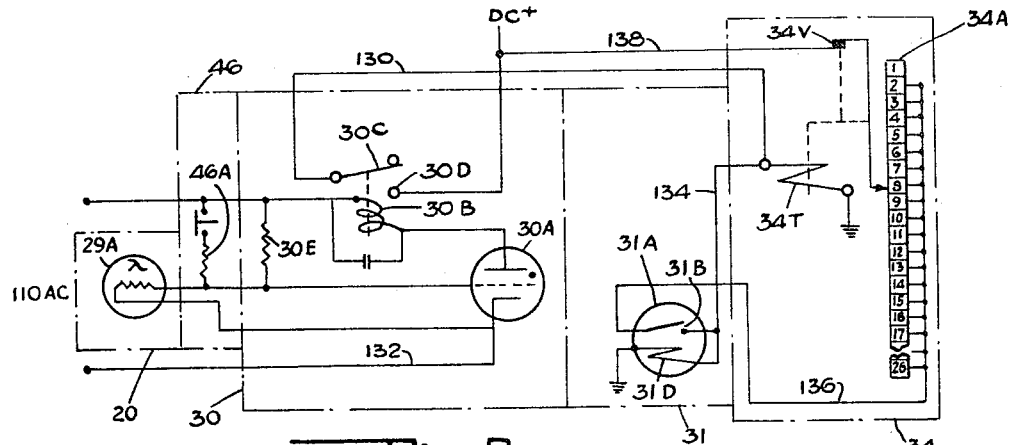
FIG. 2 is a schematic diagram showing the pulsed relay and synchronization circuit of FIG. 1.

FIG. 2 schematically shows specific details of the pulsed relay and synchronization circuit. When, for example, a programmed mark 32 passes between light source 29 and receiver 29A, the resistance of 29A is increased thereby increasing the voltage on the grid of gaseous tube 30A. Increased grid voltage causes the tube to conduct current to energize relay coil 30B closing normally open relay contacts 30C and 30D to permit D.C. voltage to energize coil 34T of stepping relay 34 through conductor 130. Energizing coil 34T opens normally closed switch 34V and mechanically prepares the sliding contacts of levels 34A, 34B, 34C and 34D for subsequent sliding advancement. When opened, switch 34V interrupts the power supply through conductor 138 to relay 34 to prevent arcing when the contacts of the levels advance. The mark having been passed, the tube and relay revert to original operating conditions, and D.C. voltage is removed from coil 34T. It is characteristic of relay 34 that, when coil 34T is deenergized, levels 34A, 34B, 34C and 34D each advances one step in its sequence with the same step number for each level. It will be noted that the closing of contacts 30C and 30D conducts current to heater 31D of thermal relay 31A. Since, however, mark 32 is not wide enough, coil 30B is deenergized before normally open bimetal switch 31B is closed.

When an abnormally long precalibrated mark, such as mark 27 (FIG. 4), passes between the source 29 and receiver 29A, the operation is the same as described above except that coil 30B is energized for a much longer period of time. This long energization permits heater 31D to close bimetal switch 31B and pass current to coil 34T through conductor 134. When the mark 27 passes, coils 30B and 34T will be deenergized and relay 34 will advance one step. Should this step be other than step one of level 34A, voltage will be transferred through conductor 138, switch 34V, the sliding contact of level 34A, conductor 136, closed switch 31B and conductor 134 to energize coil 34T. At this time, coil 34T will open switch 34V thus becoming self-interrupted. This interruption will advance relay 34 one step. The process is repeated until step one of 34A is reached. Since step one does not provide a closed circuit, it is necessary to energize coil 30B by another mark to actuate relay 34.

The effect of a program marking may be simulated by closing push-button 46. When switch 46 is depressed, resistance 46A is placed in parallel with resistance 30E. The parallel resistance of this combination is lowered so that the voltage across 29A and the grid of tube 30A is increased enough to actuate the tube and relay 30B as previously described.

Thusly, it is seen that the programming by programmer 20 is extremely accurate, flexible and easily adapted to provide any combination of analysis time and sequence as required.

Figures 5, 6:
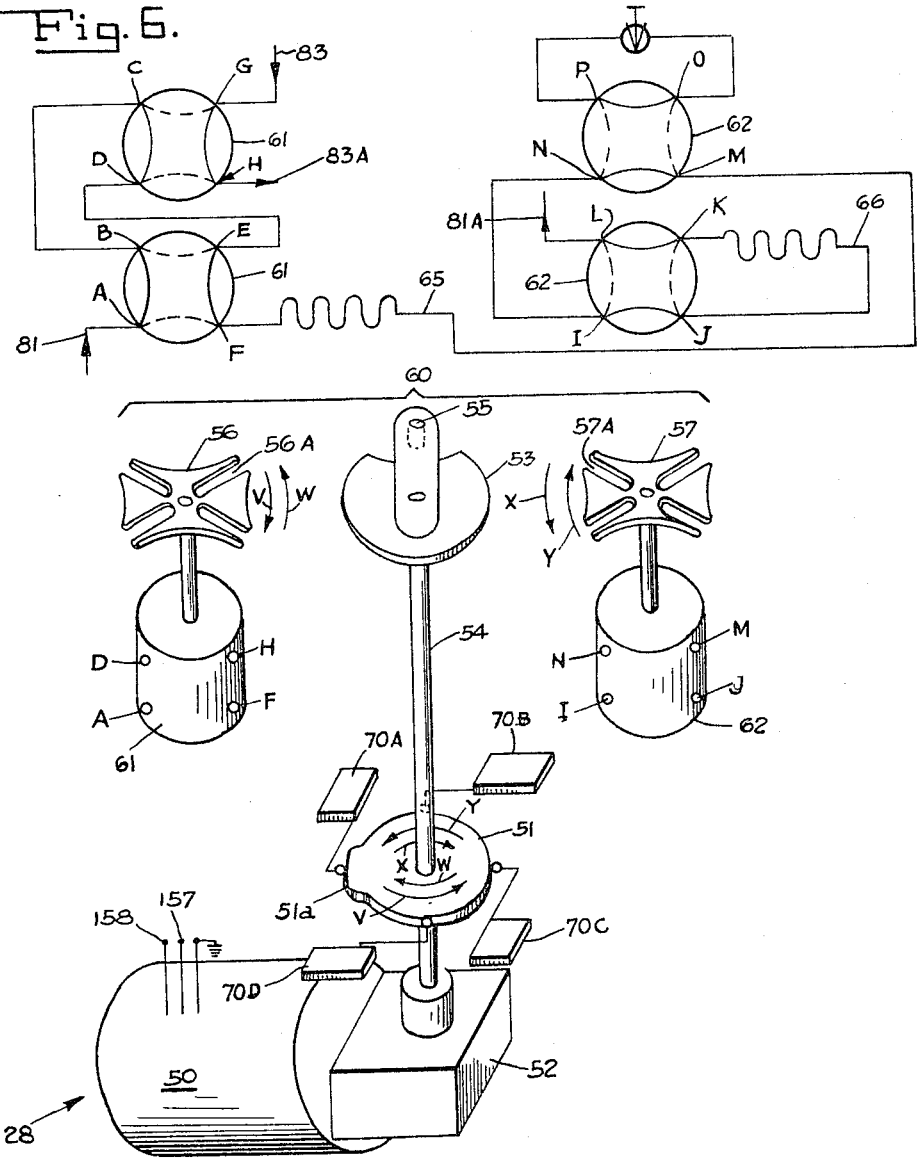
FIG. 5 is a perspective view, partially exploded, of the chromatographic valves and the valve controller.
FIG. 6 is a schematic flow diagram of the analysis unit.

Looking now at FIG. 5, valve positioner 28 comprises a conventional reversible motor 50 which drives cam 51 and driver 53 through gear box 52 and shaft 54. Driver 53 drives cam follower 55 which actuates sprockets 56 and 57. The sprockets and driver are commonly known as a geneva movement indicated by numeral 60. Briefly, when follower 55 rotates counterclockwise through 180°, it engages sprocket or cam slot 56A to effect 90° clockwise rotation of sprocket 56. Similarly, 180° clockwise rotation of follower 55 engages slot 56A to take it back to its original position through a 90° rotation. Follower 55 engages slot 57A in the same manner. Although sprockets 56 and 57 each have four cam slots, only one of each is numbered. Sprockets 56 and 57 actuate valves 61 and 62 which provide the required fluid flow in the chromatographic columns 65 and 66 schematically shown in FIG. 6. Cam 51 (FIGS. 5 and 7) actuates switches 70A, 70B, 70C and 70D. Switches 70A and 70C through conductors 72 and 73 determine the direction in which the motor 50 will rotate depending upon which motor winding is powered through the motor relay circuit 50A between motor 50 and levels 34D and 34C of relay 34. Power on conductor 72 drives motor 50 counterclockwise in step one of level 34D and clockwise in step three. Power on conductor 73 drives motor 50 clockwise in step two and counterclockwise in step four. Switches 70B and 70D provide a means for synchronizing the position of valves 61 and 62.

Figure 7:
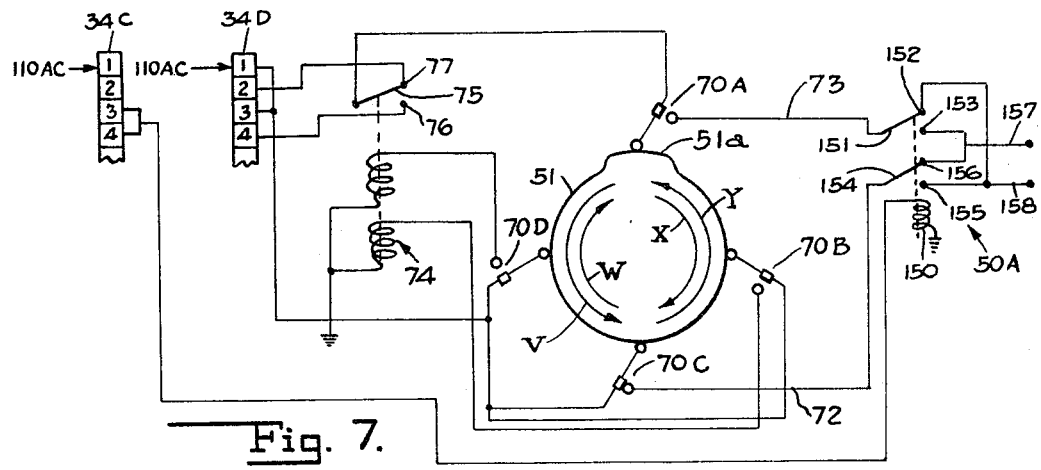
FIG. 7 is a schematic wiring diagram for the valve controller of FIG. 5.

Referring to FIG. 7, the arrows V, W, X and Y indicate direction and extent of cam rotation. When the motion of cam 51 is in the direction of arrow V, motor 50 turns in a counterclockwise direction. Similarly, when the cam moves in the direction of arrows W, X or Y, motor 50 rotates in clockwise, or counterclockwise direction, respectively. Switches 70A and 70C are normally biased closed and are opened by lobe 51A. Switches 70B and 70D are normally biased open and are closed by lobe 51A. To actuate cam 51 in the direction of arrow V, step one on level 34D of relay 34 powers conductor 72 through switch 70C. This circuit to motor 50 is completed through contact 154 of relay 150 closed upon contact 156 and motor conductor 157 to rotate the motor in a counterclockwise direction. This motion is completed when lobe 51A opens switch 70C. During this rotation of cam 51, latching relay 74 is energized by way of switch 70D when lobe 51A closes it to close contacts 75 and 77. To actuate cam 51 in the direction of arrow W, step two on level 34D powers conductor 73 through contacts 75, 77 and switch 70A which is now closed. This circuit to motor 50 is completed through contact 151 of relay 150 closed upon contact 152 and motor conductor 158 to rotate the motor in a clockwise direction. This motion is completed when lobe 51A opens switch 70A. The direction noted by arrow X is accomplished by step three of level 34D supplying power to conductor 72 through switch 70C. Simultaneously with the movement of the sliding contact of level 34D to step three, the sliding contact of level 34C also is at its step three energizing relay 150 to close contacts 151 upon 153 and 154 upon 155. Thus, conductor 72 is connected to motor 50 through closed contacts 154, 155 and conductor 158 to rotate the motor clockwise. During this rotation of cam 51, latching relay 74 by way of 70B closes contacts 75 and 76. Similarly, the direction indicated by arrow Y is accomplished by position four of level 34D supplying power to conductor 73 through contacts 75, 76 and switch 70A. Since step four of level 34C is still holding relay 150, conductor 73 is connected to motor 50 through contacts 151, 153 and conductor 157 to rotate the motor counterclockwise. These last two motions are completed in the same manner mentioned above for the first two. The change in direction of motor 50 positions valves 61 and 62. Directions V and W permit valve 61 to be driven first in a clockwise direction and then in a counterclockwise direction. Directions X and Y permit valve 62 to be driven first in a counterclockwise direction and then in a clockwise direction. It is to be noted that cam 51, and valves 61 and 62 are correlated in a manner whereby, if directions of the cam are unintentionally missed for one reason or another, the valves will be placed in their original positions at the start of every sequence. For example, after step one of level 34D has effected the first movement of valve 61, the only signal that could cause motor 50 to rotate is one resulting from step two. Steps one and three would be inoperative since switch 70C would be open and step four would be inoperative because of opened contacts 75 and 76. When step two has effected movement completion of valve 61, the only signals that are operational are those resulting from steps one and three. Step four will not cause operation due to open contacts 75 and 76. The other phases of valve rotation are similarly governed. Thus, valves 61 and 62 will always operate in the proper sequence.

One example of a typical flow scheme can best be seen by referring to FIG. 6. The initial position of valve 61 is represented by the dotted line position and the initial position of valve 62 is represented by the solid line position. Carrier fluid, for example, helium, enters inlet 81, through ports A and F of valve 61, thence to column 65, to ports M, N, I and J of valve 62, to column 66, to ports K and L (valve 62) and finally to outlet 81A and detector cell 24. This detector cell, as an example, is a conventional thermal conductivity cell. Sample gas, for example, hydrocarbons such as methane, ethane and propane, enters inlet 83 and passes through ports G, C, B, E, D and H of valve 61 to outlet 83A. The initial step of the cycle is the actuation of valve 61 to the solid line position by rotation in the V direction and extent. Sample gas is now diverted through sample inlet 83, ports G and H to outlet 83A. Helium enters inlet 81, ports A, B, C, D, E and F to column 65, thus sweeping a known volume of sample gas from sample conduit BCDE into column 65. Valve 62, in the meantime, remains in the solid line position, so that columns 65 and 66 are in a series flow path. After a suitable time period, long enough to insure complete flushing of the sample conduit, BSDE, valve 61 is returned to the dotted line position by rotation in the W direction and extent, resuming sample gas flow from inlet 83 through ports G, C, B, E, D and H to outlet 83A. Helium flow is now direct from inlet 81, through ports A and F to column 65. When the light components in the sample gas have entered column 66, but not exited therefrom, valve 62 may be actuated to the dotted line position by rotation in the X direction and extent, trapping column 66, between ports J and K of valve 62, in a non-flow condition. The heavy components eluting from column 65 may then pass through ports M and O, a suitable restrictor, ports P, N, I and L to outlet 81A to detector 24, thus bypassing column 66.

When the heavy components have been eluted through detector 24, valve 62 may be actuated to the solid line position by rotation in the Y direction and extent, resuming series flow of helium through columns 65 and 66. The light components of the sample are now eluted from column 66 through ports K and L, outlet 81A, and detector 24. Valves 61 and 62 are in position to begin a new analytical cycle. Many combinations of valve actuation may be accomplished by modifications of the sprocket drive mechanism and stepping relay circuitry for applicability to other flow schemes.

The analysis unit or chromatograph is housed in a Crouse-Hinds type EPC explosionproof condulet or housing 85 as shown in FIG. 8. This type of structure facilitates both maintenance and thermostating of the assembly. Housing 85 comprises an outer metallic cylinder 78 and intermediate metallic cylinder 80 having an upper opening 82 and lower opening 83. Inner metallic cylinder 86 is of the Dewar flask type having a bottom member 88 forming chamber 87. Mandrel 90 is fabricated from a heavy aluminum mass and is shaped as a truncated cone. Chromatographic columns 65 and 66 of metallic tube are wrapped around mandrel 90, and are connected to valves 61, 62 and detector 24. The fluids enter the valves and into columns 65 and 66 to pass into detector cell 24, and then are vented. The columns, valves, detector cell and gas conduit are merely shown schematically for ease of illustration. A mandrel heater 92 is imbedded in the mandrel 90 for purposes explained later. A thermistor 94 is located at opening 82, and bimetal thermostats 95 and 96 are located in the mandrel. Motor driven fan 98 is located at the bottom of cylinder 78, and an electric heater 99 is positioned around the lower end of cylinder 80.

Figure 9:
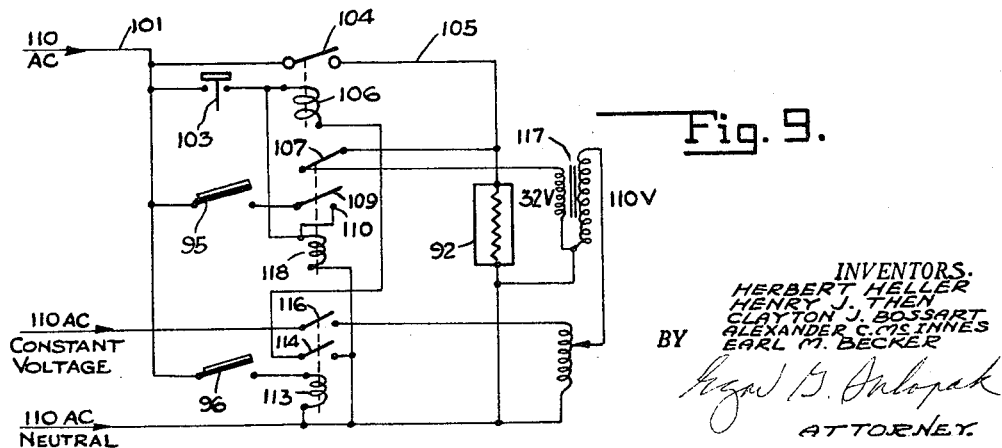

Two temperature zones are set up by the above-described structure. Chamber 87 constitutes the high temperature zone. This zone contains the adsorption columns, valves, geneva movement, and the thermal conductivity detector cell. A 3000 watt heater 92 is employed as a source of heat. Noting FIGS. 8 and 9, the operation is explained when a fast warmup of the apparatus is desired. Depressing push button 103 applies 110 v. A.C. directly to heater 92 through conductors 101, switch 104 and conductor 105. Switch 104 is closed by the actuation of relay 106. Relay 118 opens switch 107 and closes contact 109 with 110. This heat is applied until the temperature level of bimetal low temperature thermostat 95 is reached. This temperature is several degrees below the operating temperature selected for the chromatographic columns. During this time, safety thermostat 96 is closed and relay 113 has closed switches 114 and 116.

When the above mentioned temperature level has been reached to open thermostat 95, and since safety high temperature thermostat 96 is closed, relay 118 closes switch 107 and opens contacts 109 and 110 to provide power through a 32 volt step-down transformer 117. If the temperature exceeds 500° F., for example, thermostat 96 will open cutting off all power to heater 92.

The low temperature zone is located in the space designated as 120 (FIG. 8). This zone must be under thermal control to provide constant heat flow from chamber or zone 87. As long as heat flow is constant, temperatures can be made stable by even supply of heat to match the flow from the chamber. Air is directed through the low temperature zone 120 by means of a motor driven fan 98. This air is warmed when required by a 450 watt heater 99 which is governed by a balanced thermistor bridge control unit 122. A glass encased thermistor sensing element 94 forms one side of the bridge and senses temperature changes as small as 0.3° F. As thermal equilibrium exists between the high and low temperature zone, the temperature at this point should not vary very much, but as the ambient temperature varies, the thermistor will sense this change to heat up the low temperature zone to maintain a stable temperature within the high temperature zone. Indicating light 124 is merely a visual means to determine whether the heater is operating. Thusly, it is readily seen that stable temperature is provided throughout the main portion of the analyzer so as to insure sensitivity and stableness in the analyzer.

Detector 24 (FIGS. 1 and 8) quantitatively detects the gases separated during passage through columns 65 and 66. The gases leaving outlet 81A of column 66 are passed through a thermal conductivity cell in detector 24 producing signals characteristic of the gases. These signals are passed through signal attenuation network 38 to recorder 40 which indicates the amount and kind of gases. If the signals are of such magnitude as not to be compatible with the scale of recorder 40, network 38 will attenuate the signals to properly record them. The magnitude of these signals are predetermined by calibration with known samples of gases so that the proper network 38 can be selected to match the type recorder 40 desired. The detector signals are attenuated at programmed intervals determined by the number of relay steps selected on level 34D of relay 34. Thus, the manner of marking programmer 20 determines the sequence of signal attenuation relative to the sequence of operation of all other analyzer components.

A brief description of the manner in which the analyzer operates will now be stated. After the housing 75 has been properly prepared temperature-wise and tape 21 marked to provide the desired programming, the gases to be measured are connected to the inlet of valve 61. Tape 21 is started and the marks thereon produce signals responded to by pulsed relay 30 and synchronization circuit 31 to actuate the four levels of stepping relay 34. Level 34A further forms a loop with circuit 31 for resetting all levels of the relay to the starting position when a longer signal than normal is produced by the programmer. As the levels operate in sequence, valves 61 and 62 are rotated in the predetermined sequence by geneva movement 60 driven by reversible motor 50. The direction and extent in which this motor is operated is determined by cam 51 and the attendant circuits. Thus, the gases flow through columns 65 and 66 in response to the rotation of valves 61 and 62. The gases leaving column 66 flow through detector 24, the signals from which are attenuated at network 31 and indicated in recorder 40. The thermostating of housing 85 provides a stable temperature to insure a stable sensitivity of gas measurement. Should different sequences of gas analysis be desirable, it is necessary only to change the markings on tape 21.

Having explained the principle of the present invention and having illustrated and described what is considered to be the best embodiment, it is to be understood that, within the scope of the appended claims, the invention may be practiced otherwise than as specifically illustrated and described.

We claim:
1. In a device for fluid analysis having at least one chromatographic column adapted to contain sample and carrier fluid, valve means operatively associated with said column and selectively processing the sample and carrier fluids relative to each other for the separation thereof, a programmer comprising a flexible tape having marks thereon representative of a desired chromatographic program, means to move said tape past means responsive to said marks for producing output signals, means for receiving said signals and including relay means, a stepping relay means for sequentially actuating said valve means and including a power source, said relay means connected in series with said power source and actuated in response to said signals to open and close said power source for actuating said stepping relay means, and synchronization means connected to said stepping relay means for resetting it to its starting position in response to certain of said signals.

2. A programming apparatus comprising a first means for producing short signals and at least one long signal representative of a desired program; a relay having a first coil and having normally open relay contacts connected to a power source; said first means actuating said first coil to open and close said relay contacts and the closed time of said contacts being determined by the length of said signals; a stepping relay having stepped contacts, a sliding contact, a normally closed switch and a second coil in series with said relay contacts; said second coil being actuated by the opening and closing of said relay contacts to sequentially actuate said sliding contact against said step contacts when deenergized and to open said switch when energized; a time delay means having an energy storing means connected in series with said relay contacts and having normally open switch means actuated by said energy storing means; said switch means connected between said second coil and each of said step contacts except the first step and provides power to said second coil when closed to reset the stepping relay to its first step; and said first means closing said relay contacts in response to said long signal for a time to provide sufficient energy to be stored in said energy storing means for closing said switch means.

3. The combination of claim 2 and, said energy storing means comprises a heater and said switch means comprises a bimetal switch.

References Cited by the Examiner

UNITED STATES PATENTS

| 2,800,539 | 7/1957 | Edminster et al. | 200—46 |
| 3,023,605 | 3/1962 | Burk | 73—23.1 |
| 3,026,722 | 3/1962 | Jonach | 73—116 |
| 3,164,691 | 1/1965 | Blouin | 200—46 |

FOREIGN PATENTS

| 814,606 | 6/1959 | Great Britain. |

RICHARD C. QUEISSER, *Primary Examiner.*